United States Patent [19]

Kikuchi

[11] Patent Number: 5,409,988
[45] Date of Patent: Apr. 25, 1995

[54] RUBBER COMPOSITION

[75] Inventor: Naohiko Kikuchi, Nishinomiya, Japan

[73] Assignee: Sumitomo Rubber Industries, Ltd., Hyogo, Japan

[21] Appl. No.: 73,049

[22] Filed: Jun. 8, 1993

[30] Foreign Application Priority Data

Jun. 8, 1992 [JP] Japan ................... 4-147278

[51] Int. Cl.$^6$ .................. C08L 9/06; C08L 47/00
[52] U.S. Cl. ................... 524/526; 524/505; 525/236; 525/237
[58] Field of Search ............. 524/526, 505; 525/236, 525/237

[56] References Cited

U.S. PATENT DOCUMENTS

| | | | |
|---|---|---|---|
| 3,366,585 | 1/1968 | Davison et al. | 525/236 |
| 4,433,094 | 2/1984 | Ogawa et al. | 524/526 |
| 4,515,922 | 5/1985 | Sakakibara et al. | 525/236 |
| 4,522,970 | 6/1985 | Scriver et al. | 524/526 |
| 4,530,959 | 7/1985 | Armbruster et al. | 524/526 |
| 4,745,150 | 5/1988 | Ide et al. | 524/505 |
| 5,082,901 | 1/1992 | Linster | 524/526 |

FOREIGN PATENT DOCUMENTS

| | | |
|---|---|---|
| 664823 | 12/1965 | Belgium . |
| 0074233 | 3/1983 | European Pat. Off. . |
| 0161793 | 11/1985 | European Pat. Off. . |
| 0263885 | 4/1988 | European Pat. Off. . |

OTHER PUBLICATIONS

Derwent WPI Acc. No. 85-289775/47 (1985), Abstract of USP 4,640,952.
Derwent WPI Acc. No.: 87-217747/31 (1987), Abstract of USP 4,745,150.

Primary Examiner—Paul R. Michl
Assistant Examiner—Olga Asinovsky
Attorney, Agent, or Firm—Birch, Stewart, Kolasch & Birch

[57] ABSTRACT

The present invention provides a rubber composition comprising:

(i) a rubber component comprising 70 to 90% by weight of a styrene-butadiene copolymer rubber (A) containing 20 to 40% by weight of a styrene content and 30 to 60% by weight of a vinyl content in a butadiene portion, which is obtained by solution polymerization, and 10 to 30% by weight of a polybutadiene rubber (B)

(ii) a vulcanizing agent in an amount of 0.75 to 1.75 parts by weight based on 100 parts by weight of the rubber component (i) and (iii) a plasticizer;

wherein the plasticizer is present in an amount such that the amount of acetone extract obtained by extracting a vulcanized rubber sample obtained from the rubber composition with a Soxhlet apparatus in an acetone solvent for 24 hours is 20 to 26% by weight of the vulcanized rubber sample, and at least 80% by weight of the acetone extract being the plasticizer.

8 Claims, No Drawings

RUBBER COMPOSITION

BACKGROUND OF THE INVENTION

1. Field of the Invention

The present invention relates to a rubber composition. More particularly, it relates to a rubber composition for a tire tread.

2. Description of the Related Art

Passengers cars now have very high performance due to, for example, the enhanced power output of engines and the lightening of body weight. As a result, starting, accelerating and turning properties of the car are significantly improved.

The improvement in such moving properties requires high steering stability and a tire which transmits the power of the car to the road surface. Also, the recent environmental protection and energy-efficiency requirements require reduction in the rolling resistance of the tire (low heat build-up) and high wear resistance.

In order to ensure steering stability, it is necessary to enhance grip force at the tread part which shows high energy loss properties, for which various improvements have been made.

Examples of conventional methods for enhancing the grip force of a rubber in a tread material include a method wherein a large amount of high reinforcing carbon black is formulated in a rubber composition for tire treads, and hardness and modulus are controlled by a plasticizer. However, internal heat build-up becomes high, and the stiffness of the tread is also deteriorated due to rolling resistance or changes hardness in the driving. While further, when an excessive amount of the plasticizer is added, wear resistance is extremely deteriorated.

There is also a method of enhancing the molecular weight of a rubber in a tread material to improve heat build-up and wear resistance. However, workability becomes inferior, and enhancement of the molecular weight has its limits.

As described above, grip force, heat build-up and wear resistance of the tire tread material are antinomic to each other, even if a conventional material is used. Therefore it has been considered to be impossible to improve both of the above properties, simultaneously.

SUMMARY OF THE INVENTION

The present inventors have intensively studied to improve these problems. As a result, it has been found that, by formulating a styrene-butadiene copolymer rubber (A) and a polybutadiene rubber (B) in a specific proportion and specifying an amount of an acetone extract, the objects of the invention, set forth below, can be accomplished, and the present invention has been completed.

One object of the present invention is to provide a rubber composition simultaneously having high grip force, low heat build-up and high wear resistance.

This object as well as other objects and advantages will be apparent to those skilled in the art from the following description.

The objects and advantages of present invention, are fulfilled by providing a rubber composition which comprises:

(i) a rubber component comprising 70 to 90% by weight of a styrene-butadiene copolymer rubber (A) containing 20 to 40% by weight of a styrene content and 30 to 60% by weight of a vinyl content in the butadiene portion, which is obtained by solution polymerization, and 10 to 30% by weight of a polybutadiene rubber (B)

(ii) a vulcanizing agent in an amount of 0.75 to 1.75 parts by weight based on 100 parts by weight of the rubber component (1) and (iii) a plasticizer;

wherein the plasticizer is present in an amount such that the amount of acetone extract obtained by extracting a vulcanized rubber sample obtained from the rubber composition with a Sochlet apparatus in an acetone solvent for 24 hours is 20 to 26% by weight of the vulcanized rubber sample, and at least 80% by weight of the acetone extract being the plasticizer.

The present invention also provides a tire tread obtained by molding the rubber composition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED EXPLANATION OF THE INVENTION

According to the present invention, a rubber composition having suitable physical properties (e.g. hardness, modulus, etc.) as well as high grip force, low heat build-up and high wear resistance can be obtained by the combination of the above components.

The copolymer rubber (A) used in the present invention is produced by solution-polymerizing styrene and butadiene. The resulting styrene-butadiene copolymer has a binding styrene content of 15 to 60% by weight, preferably 15 to 40% by weight, and a vinyl content in the butadiene portion of 30 to 60% by weight, preferably 40 to 60% by weight.

When the binding styrene content is smaller than 15 % by weight, high hysteresis loss (grip force) and practical strength become insufficient. When it exceeds 40% by weight, the glass transition point becomes too high, which results in high temperature dependence. Further, heat build-up and rolling resistance increase.

When the vinyl content in the butadiene portion is smaller than 30% by weight, high hysteresis loss is insufficient. While a large vinyl content in the butadiene portion, in comparison with the binding styrene content, is advantageous, when the vinyl content exceeds 60 % by weight, its strength is poor and wear resistance and tread-groove cracking resistance are inferior.

In the present invention, in order to improve wear resistance and low temperature properties, the polybutadiene rubber (B) is admixed in an amount of 10 to 30% by weight based on 70 to 90% by weight of the styrene-butadiene copolymer rubber (A) to form a rubber component.

When the mixing proportion of the component (B) is smaller than 10% by weight, the improvement in wear resistance and low-temperature properties is insufficient. When it exceeds 30% by weight, high hysteresis loss becomes insufficient and the grip force on wet road surface is deteriorated.

A plasticizer is formulated in the rubber composition to improve workability and stability of the vulcanized rubber.

The plasticizer is formulated such that an amount of an acetone extract obtained by extracting a vulcanized rubber obtained from the rubber composition with a Soxhlet apparatus in an acetone solvent for 24 hours is 20 to 26% by weight of the whole rubber composition. In the present invention, at least 80% by weight of the acetone extract is the plasticizer or softener. Any plasticizer which has been known in the art can be used. Typical examples of the plasticizers include aromatic oil, mineral oil and paraffinic oil.

Additional formulating component other than the plasticizer include, for example, stearic acid, waxes, vulcanization accelerators, and the like.

When the amount of the acetone extract is smaller than 20% by weight, it is necessary to decrease the amount of a filler in order to obtain suitable hardness. As a result, high hysteresis loss becomes insufficient. On the other hand, when the amount of the acetone extract exceeds 26% by weight, wear resistance rapidly decreases in spite of the increase of high hysteresis loss accompanied by the formulation of the filler, and the composition is of no practical use.

To the rubber composition of the present invention, a vulcanizing agent (e.g. sulfur, etc.) and a vulcanization accelerator may be added, optionally. The amount of the vulcanizing agent may be 0.75 to 1.75 parts by weight based on 100 parts by weight of the rubber component (i). It has been found that a balance between high hysteresis loss and wear resistance is most excellent in the above range.

When the amount of the vulcanizing agent is smaller than 0.75 parts by weight, sufficient hardness can not be obtained. Further, since SBR having high vinyl content is used as a main component, the number of double bonds of the main chain is, the vulcanization rate becomes extremely low, and the composition is of no practical use. When the amount exceeds 1.75 parts by weight, wear resistance and mechanical fatigue resistance are deteriorated.

Examples of the vulcanization accelerator include thiazole based accelerators (e.g. accelerator M, etc.), sulfenamide based accelerators (e.g. accelerator CZ, accelerator NS, etc.) and the like. The vulcanization accelerator is formulated in an amount of 1.00 to 4.00 parts by weight, preferably 1.00 to 3.00 parts by weight based, on 100 parts by weight of the rubber component. When the amount is smaller than 1.00 parts by weight, the vulcanization rate is low, and sufficient hardness can not be obtained, and the composition is of no practical use. When it exceeds 4.00 parts by weight, the crosslinking density becomes large and, further, the refractive fatigue property and wear resistance become inferior.

To the rubber composition of the present invention, filler (e.g. carbon black, zinc white, stearic acid, etc.), additives (e.g. oil, antioxidant, wax, etc.), and the like may be formulated.

As the carbon black, there can be used those having an iodine adsorption of at least 80 mg/g, for example, HAF, ISAF or SAF which is commercially available from Showa Cabot Co., Mitsubishi Chemical Industries Co. or Tokai Carbon Co. When the iodine adsorption is smaller than 80 mg/g, no wear resistance is obtained because of insufficient reinforcement, and further, sufficient grip performances can not be obtained. The amount of the carbon black may be 50 to 150 parts by weight (based on 100 parts by weight of the rubber). When the amount is smaller than 50 parts by weight, wear resistance and grip performances becomes insufficient because of insufficient reinforcement. When it exceeds 150 part by weight, heat build-up of the rubber becomes large and rolling resistance also becomes large. Therefore, the amount is preferably 70 to 120 parts by weight.

As the oil, an aromatic oil is preferred. The amount of oil may be 20 to 100 parts by weight, preferably 40 to 70 parts by weight, based on 100 parts by weight of the rubber component. When the amount is smaller than 20 parts by weight, hardness of the vulcanized rubber becomes too large and it is not suitable as the tread. When it exceeds 100 parts by weight, viscosity of the rubber before vulcanizing becomes too small and, therefore, problems in workability result.

The rubber composition thus obtained is kneaded with an extruder and formed into a predetermined form of the rubber, which is vulcanized together with other constituent rubber components of a tire, to obtain a tire. The vulcanization conditions are known.

As described above, a rubber composition having suitable physical properties (e.g. hardness, modulus, etc,) as well as high grip force, low heat build-up and high wear resistance, can be obtained according to the present invention.

EXAMPLES

The following Examples and Comparative Examples further illustrate the present invention in detail but are not to be construed to limit the scope thereof. In the Examples and Comparative Examples, all "parts" and "percents" are by weight unless otherwise stated.

Examples 1 to 3 and Comparative Examples 1 to 8

By using the styrene-butadiene copolymer rubbers shown in Table 1 and the components shown in Table 2, respectively, rubber compositions were prepared by normal methods. The rubber composition was extruded and molded to obtain a tire (tire size: 225/50R16). The following items were evaluated using the tires obtained above. All tests were conducted at a tire inside pressure of 2.5 Kgf/cm$^2$. The results are shown in Table 3.

An evaluation of the test sample was conducted as follows.

(1) Turning properties:

An evaluator rode in a 3,000 cc passenger car, and drove with turning on an asphalt surface having a diameter of 50 m. After driving, the feeling of turning was evaluated with 5 grades. The larger the number, the better the feeling.

(2) Brake index:

The speed of a 3,000 cc passenger car was reduced from 40 Km/h to 20 Km/h to obtain a retardation. Numbers in Table 3 are indexes which are calculated with the tires of Example 2 being assigned a base index of 100. The larger the number, the better the braking results.

The roads for the tests (1) and (2) were an asphalt road (wetted state) of Skid No. about 50.

(3) Rolling resistance:

A rolling resistance was determined using a rolling resistance tester at a speed of 80 Km/h and a load of 35 Kgf. Numbers in Table 3 are indexes which are calculated with the tire of Example 2 being assigned a base index of 100. The smaller the number, the better the rolling resistance.

(4) Wear resistance:

A person rode on a 3,000 cc passenger car and drove on a wear test road. After covering 10,000 Km, wear loss was measured. Numbers in Table 3 are indexes which are calculated with the tires of Example 2 being assigned a base index of 100. The larger the number, the better.

TABLE 1

| Styrene-butadiene copolymer rubber* | Bound styrene content (% by weight) | Vinyl content in butadiene portion (% by weight) | Kind of polymerization |
|---|---|---|---|
| (a) | 45 | 18 | Emulsion polymerization |
| (b) | 40 | 50 | Solution polymerization |
| (c) | 21 | 69 | Solution polyrerization |
| (d) | 15 | 57 | Solution polymerization |
| (e) | 24 | 13 | Solution polymerization |
| (f) | 35 | 45 | Solution polymerization |
| (g) | 30 | 45 | Solution polymerization |
| (h) | 30 | 40 | Solution polymerization |

*In all copolymer rubbers, an oil extending amount is 37.5 phr.

TABLE 2

| Component | Amount (parts) |
|---|---|
| Polymer (rubber component) *1 | 100 |
| ISAF black | 100 |
| Aroma oil *2 | 60 |
| Wax | 2 |
| Antioxidant *3 | 2 |
| Stearic acid | 1 |
| Zinc white | 3 |
| Sulfur | 1 |
| Vulcanization accelerator | 2 |

*1: Only a polymer content of an oil extending rubber is shown.
*2: An aroma oil contains a polymer oil extending amount.
*3: N,N'-phenyl-p-phenylenediamine

TABLE 3

|  | Ex.1 | Ex.2 | Ex.3 | Comp. Ex.1 | Comp. Ex.2 | Comp. Ex.3 | Comp. Ex.4 | Comp. Ex.5 | Comp. Ex.6 | Comp. Ex.7 | Comp. Ex.8 |
|---|---|---|---|---|---|---|---|---|---|---|---|
| Kind of SBR | (f) | (g) | (h) | (a) | (b) | (c) | (d) | (e) | (g) | (g) | (g) |
| SBR content | 85 | 85 | 85 | 85 | 85 | 85 | 85 | 85 | 100 | 95 | 70 |
| PHR content | 15 | 15 | 15 | 15 | 15 | 15 | 15 | 15 | 0 | 5 | 30 |
| Turning properties | 5 | 4 | 4 | 5 | 5 | 4 | 3 | 2 | 4 | 4 | 2 |
| Brake index | 105 | 100 | 96 | 104 | 106 | 101 | 90 | 82 | 101 | 101 | 89 |
| Rolling resistance | 104 | 100 | 97 | 117 | 129 | 98 | 91 | 87 | 102 | 100 | 95 |
| Wear resistance | 96 | 100 | 103 | 98 | 78 | 81 | 113 | 140 | 90 | 92 | 118 |

As is apparent from Table 3, Examples 1 to 3 are superior in grip performance, rolling resistance, and wear resistance in comparison with Comparative Examples 1 to 8.

A tire of Comparative Example 1, wherein an emulsion-polymerized SBR having a large bound styrene content and a small vinyl content in the butadiene portion is used, is inferior in rolling resistance. Further, the tire of Comparative Example 2, wherein the bound styrene content is small, is inferior in rolling resistance and wear resistance and the tire of Comparative Example 3, wherein the vinyl content is large, is inferior in wear resistance.

The tire of Comparative Example 4, wherein the bound styrene content is small, and the tire of Comparative Example 5, wherein the vinyl content is small are inferior in grip performance. The tires of Comparative Examples 6 and 7, wherein the amount of polybutadiene (PHR) is small, are inferior in wear resistance in comparison with Example 2. The tire of Comparative Example 8, wherein the amount of PHR is large, is superior in wear resistance, but grip on the wetted road surface is extremely deteriorated.

Examples 4 to 6 and Comparative Examples 9 and 10

By using a styrene-butadiene copolymer rubber (g) shown in Table 1, and the components shown in Table 4, a test sample shown in Table 5 were prepared, respectively. Then, tire performances for tires wherein the amount of the acetone extract is changed were evaluated. The amount of the acetone extract shown in Table 5 indicates an amount of the acetone extract obtained by extracting the rubber composition with a Soxhlet apparatus in an acetone solvent, based on the total rubber composition. According to the same manner as that described in the above Examples, a tire was prepared using the resulting rubber composition, respectively. Then, the following test was conducted, in addition to the tests (1) to (4).

Critical G test:

A person rode on a 3,000 cc passenger car and drove with turning an dried asphalt surface having a diameter of 50 m to measure maximum turning transverse G.

TABLE 4

| Component | Amount (parts) |
|---|---|
| SBR (g) | 85 |
| Polybutadiene rubber | 15 |
| ISAF | *1 |
| Aroma oil | *2 |
| Wax | 2 |
| Antioxidant | 2 |
| Stearic acid | 1 |
| Zinc white | 3 |
| Sulfur | 1 |
| Vulcanization accelerator | 2 |

*1, *2: see Table 5

TABLE 5

|  | Ex.4 | Ex.5 | Ex.6 | Comp. Ex.9 | Comp. Ex.10 |
|---|---|---|---|---|---|
| ISAF (phr) | 90 | 100 | 100 | 80 | 120 |
| Aroma oil (phr) | 50 | 60 | 70 | 40 | 80 |
| Acetone extract amount (%) | 21.9 | 23.9 | 25.6 | 19.6 | 27.1 |
| Plasticizer extract amount (%) | 19.9 | 22.1 | 24.1 | 17.3 | 25.7 |
| Turning properties | 3 | 4 | 5 | 2 | 5 |
| Brake idex | 94 | 100 | 105 | 88 | 106 |
| Critical G | 0.815 | 0.842 | 0.853 | 0.794 | 0.855 |
| Rolling resistance | 93 | 100 | 108 | 87 | 112 |
| Wear resistance | 111 | 100 | 95 | 125 | 87 |

As is apparent from Table 5, the tire of Comparative Example 9, wherein the amount of the acetone extract is smaller than 20 % by weight, is inferior in turning properties and brake index and lacks in absolute grip. In Examples 4 to 6, grip performances increases as the amount of the acetone extract increases, and rolling resistance and wear resistance are liable to be deteriorated. However, even when the acetone extract exceeds 26% as in Comparative Example 10, remarkable improvement of grip performances are not accomplished and deterioration of wear resistance is rather large, and it is not preferred.

Example 7 and Comparative Examples 11 to 13

By using a styrene-butadiene copolymer rubber (g) shown in Table 1 and components shown in Table 6, test samples shown in Table 7 were prepared, respectively. Then, tire performances wherein the amount of phosphor is changed were evaluated. The hardness (Hs) shown in Table 7 indicates a hardness of the vulcanized rubber measured at room temperature, using a JIS-A hardness tester. According to the same manner as that described in the above Examples, a tire was prepared using the resulting rubber composition, respectively. Then, the tests (1) to (4) were conducted.

TABLE 6

| Component | Amount (parts) |
| --- | --- |
| SBR (g) | 85 |
| Polybutadiene rubber | 15 |
| ISAF | 100 |
| Aroma oil | 60 |
| Wax | 2 |
| Antioxidant | 2 |
| Stearic acid | 1 |
| Zinc white | 3 |
| Sulfur | *1 |
| Vulcanization accelerator | *2 |

*1, *2: see Table 7

TABLE 7

| | Ex.7 | Ex.8 | Comp. Ex.11 | Comp. Ex.12 | Comp. Ex.13 |
| --- | --- | --- | --- | --- | --- |
| Sulfur (phr) | 1.0 | 1.5 | 0.5 | 2.0 | 2.5 |
| ACC (phr) | 2.0 | 1.5 | 2.5 | 1.0 | 0.5 |
| Hs (JIS-A) | 65 | 65 | 62 | 65 | 65 |
| Turning properties | 4 | 4 | 3 | 4 | 3 |
| Brake index | 100 | 99 | 89 | 101 | 96 |
| Rolling resistance | 100 | 99 | 105 | 100 | 98 |
| Wear resistance | 100 | 96 | 92 | 89 | 83 |

Regarding Comparative Example 11, wherein the amount of sulfur is smaller than 0.75 phr, a proper hardness can not be obtained, which results in inferior grip performances and wear resistance. Regarding Comparative Examples 12 and 13, wherein the amount of sulfur is larger than 1.75 phr, wear resistance is deteriorated. Regarding Comparative Examples 1 and 3, grip performances are also deteriorated. Examples 7 and 8 showed excellent balance between grip performances, rolling resistance and wear resistance.

What is claimed is:

1. A rubber composition comprising:
   (i) a rubber component comprising 70 to 90% by weight of a styrene-butadiene copolymer rubber (A) containing 20 to 40% by weight of a styrene content and 30 to 60% by weight of a vinyl content in the butadiene portion, which is obtained by solution polymerization, and 10 to 30% by weight of a polybutadiene rubber (B)
   (ii) a vulcanizing agent in an amount of 0.75 to 1.75 parts by weight based on 100 parts by weight of the rubber component (i) and
   (iii) a plasticizer;

wherein said plasticizer is present in an amount such that the amount of acetone extract obtained by extracting a vulcanized rubber sample obtained from the rubber composition with a Soxhlet apparatus in an acetone solvent for 24 hours is 20 to 26% by weight of the vulcanized rubber sample, and wherein at least 80% by weight of said acetone extract is said plasticizer.

2. The rubber composition according to claim 1, further comprising carbon black having an iodine adsorption of at least 60 mg/g in an amount of 50 to 150 parts by weight based on 100 parts by weight of said rubber component (i).

3. A tire tread obtained by molding the rubber composition according to claim 1 or 2.

4. The rubber composition according to claim 1, further comprising a vulcanization accelerator in an amount of 1.00 to 4.00 parts by weight, based on 100 parts by weight of said rubber component (i).

5. The rubber composition according to claim 4, wherein said vulcanization accelerator is present in an amount of 1.00 to 3.00 parts by weight, based on 100 parts by weight of said rubber component (i).

6. The rubber composition according to claim 4, wherein said vulcanization accelerator is selected from the group consisting of thiazole-based accelerators and sulfenamide-based accelerators.

7. The rubber composition according to claim 1, further comprising an additive selected from the group consisting of an oil, an antioxidant, a wax, and mixtures thereof.

8. The rubber composition according to claim 7, wherein said oil is an aromatic oil present in an amount of 20 to 100 parts by weight, based on 100 parts by weight of said rubber component (i).

* * * * *